No. 679,024. Patented July 23, 1901.
J. HOPE & W. E. BUCKLEY.
STARTING MEANS FOR AUTOCARS.
(Application filed Dec. 8, 1899.)
(No Model.) 6 Sheets—Sheet 2.

No. 679,024. Patented July 23, 1901.
J. HOPE & W. E. BUCKLEY.
STARTING MEANS FOR AUTOCARS.
(Application filed Dec. 8, 1899.)
(No Model.) 6 Sheets—Sheet 3.

WITNESSES:
Ella L. Giles
O. Dunmore

INVENTORS.
John Hope
William Edward Buckley
BY
Richards
ATTORNEYS

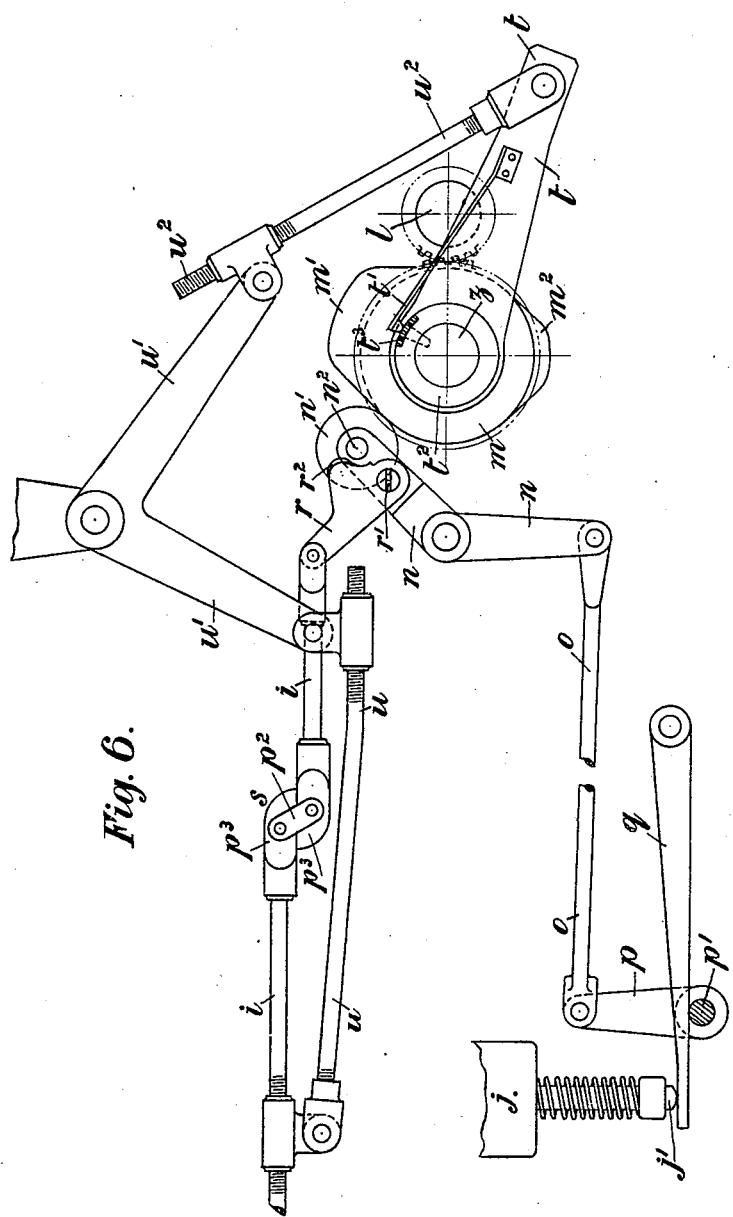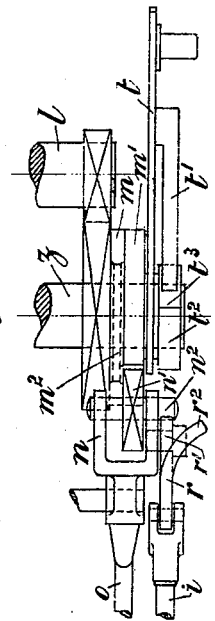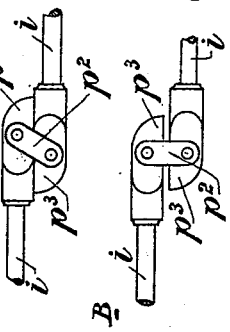

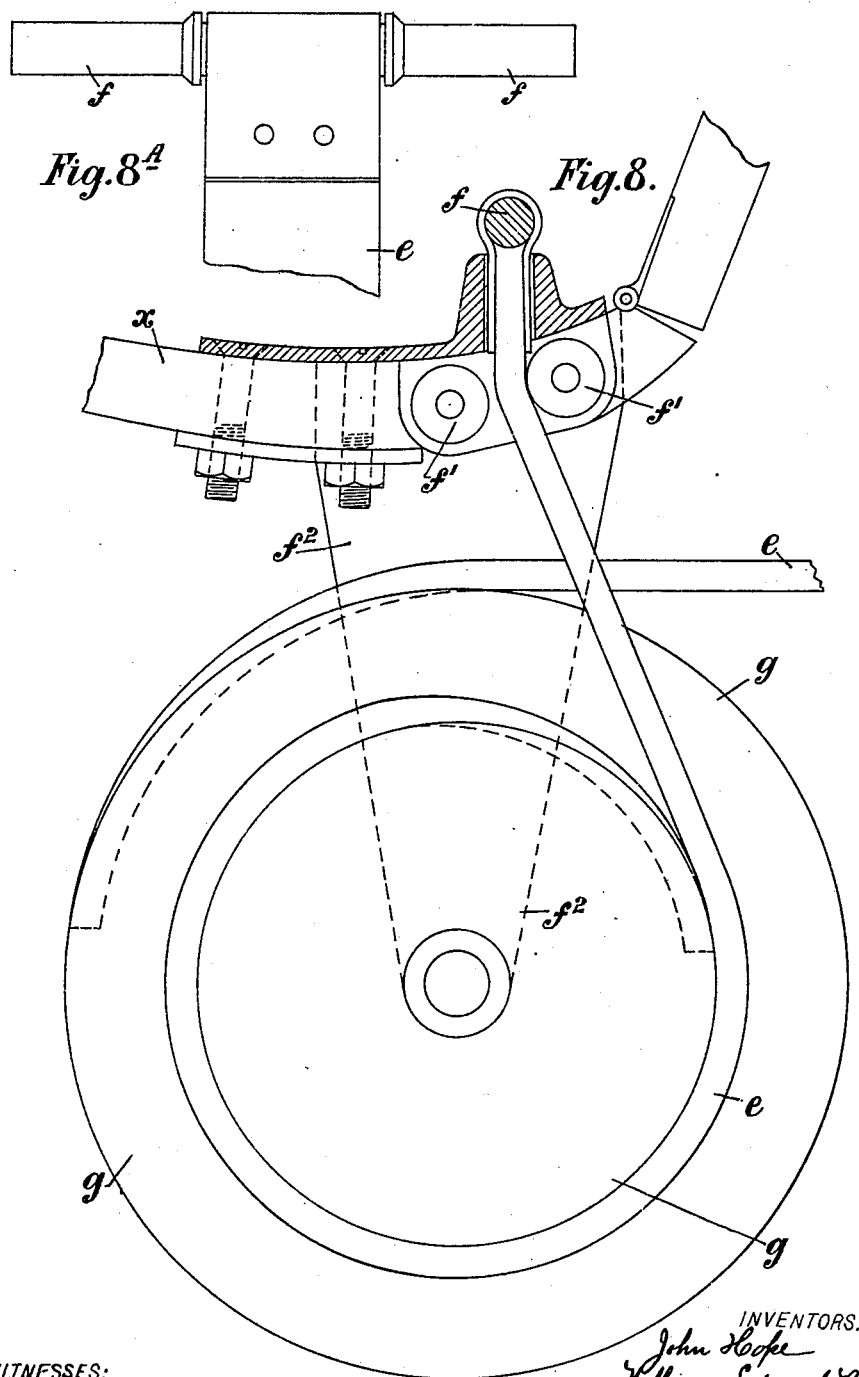

No. 679,024. Patented July 23, 1901.
J. HOPE & W. E. BUCKLEY.
STARTING MEANS FOR AUTOCARS.
(Application filed Dec. 8, 1899.)
(No Model.) 6 Sheets—Sheet 6.

WITNESSES:
Ella L. Giles
[signature]

INVENTORS.
John Hope
William Edward Buckley
BY
Richards & R.
ATTORNEYS

UNITED STATES PATENT OFFICE.

JOHN HOPE AND WILLIAM EDW. BUCKLEY, OF LIVERPOOL, ENGLAND.

STARTING MEANS FOR AUTOCARS.

SPECIFICATION forming part of Letters Patent No. 679,024, dated July 23, 1901.

Application filed December 8, 1899. Serial No. 739,650. (No model.)

*To all whom it may concern:*

Be it known that we, JOHN HOPE and WILLIAM EDWARD BUCKLEY, engineers, subjects of the Queen of England, and residents of Liverpool, England, have invented certain new and useful Improvements in or Connected with Means for Starting Autocars, of which the following is a specification.

This invention has reference to means for starting autocars, and more particularly cars which are driven by internal-combustion engines using oil or gaseous fuel; and it has for its object, mainly, to enable this to be performed from the seat or place from which the car is driven and controlled.

According to this invention there is employed in connection with the rim of the fly-wheel (or a special wheel) of the motor a gripping device having circular movement around the axis of the wheel and operated by a band, cord, or the like from the seat of the driver by pulling up a handle, and by pulling once or twice the engine is turned around and the charge ignited in the usual way. In engines of the compression type to enable this starting to be readily effected half the usual compression is employed, and for this purpose a double cam, roller, and lever device is employed for temporarily releasing the compression in the compression-stroke to this extent. According to this invention this is effected by operating the said roller-lever or roller from the operator's seat or place, say, by a lever—say a foot-lever—on the floor of the vehicle and connected with the said lever by connecting-rods. This connection is not rigid, but has free movement in itself, so that after it has been operated by the foot-lever the roller-lever of the engine can have free movement. This mechanism is also connected with the ignition device to vary the time of ignition simultaneously with the operation of the exhaust-valve mechanism.

Figure 1:
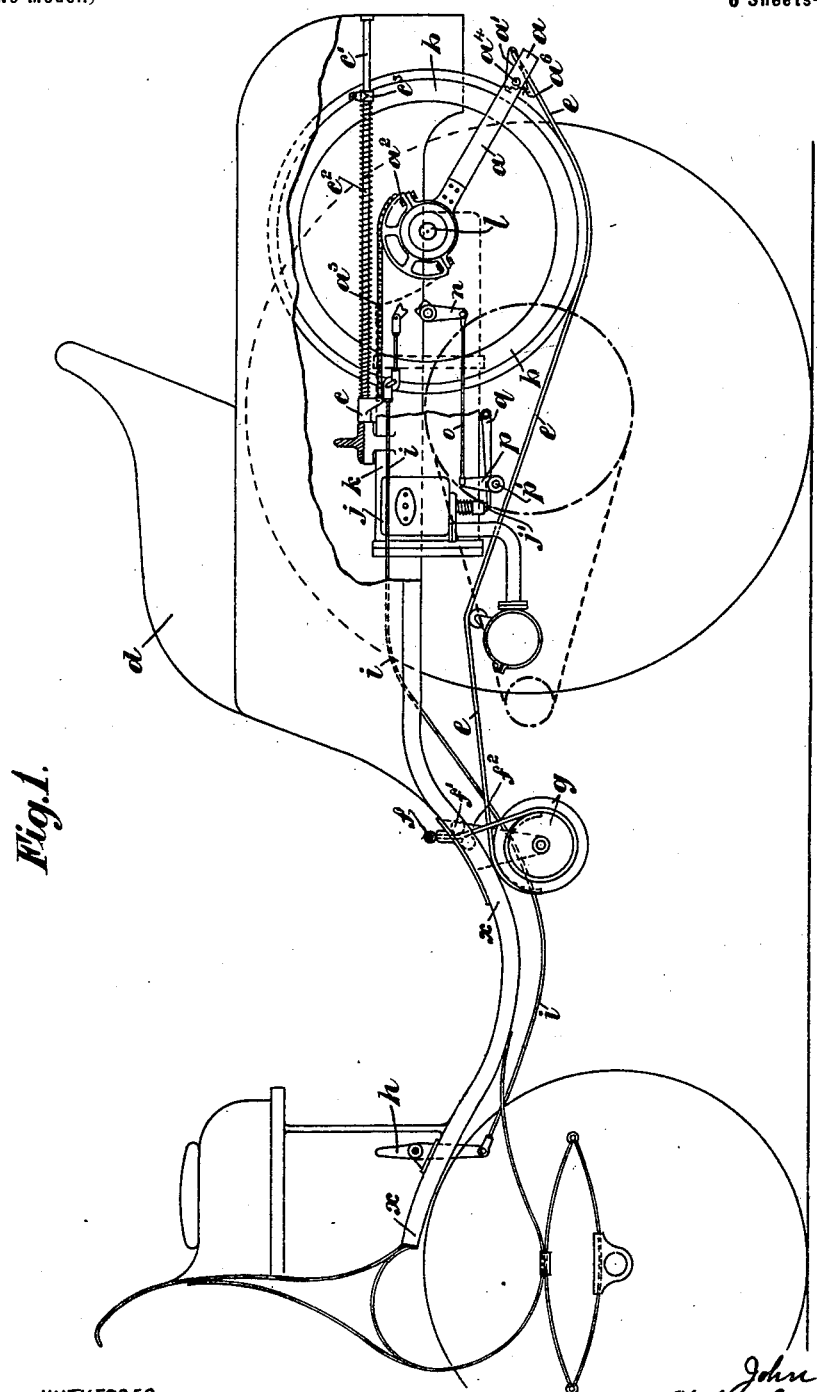
Figure 2:
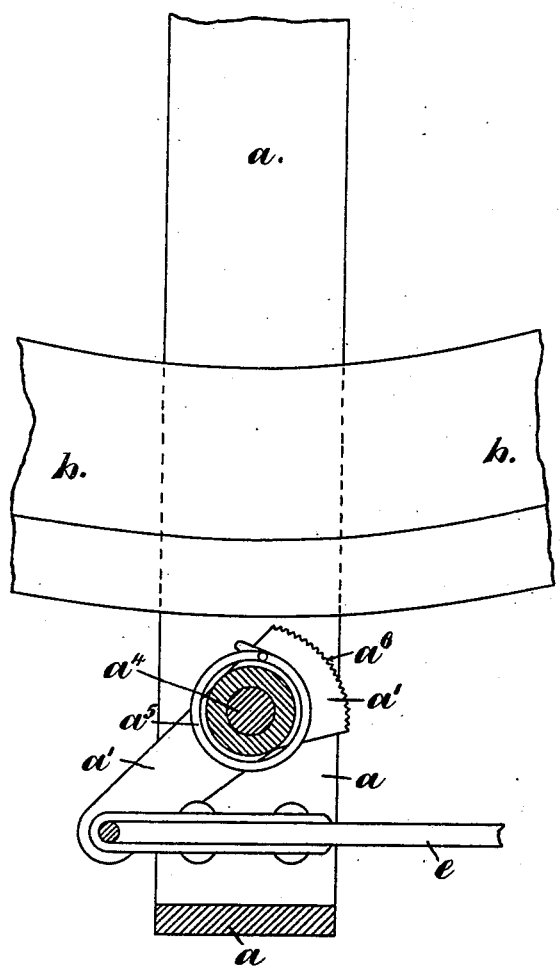
Figure 3:
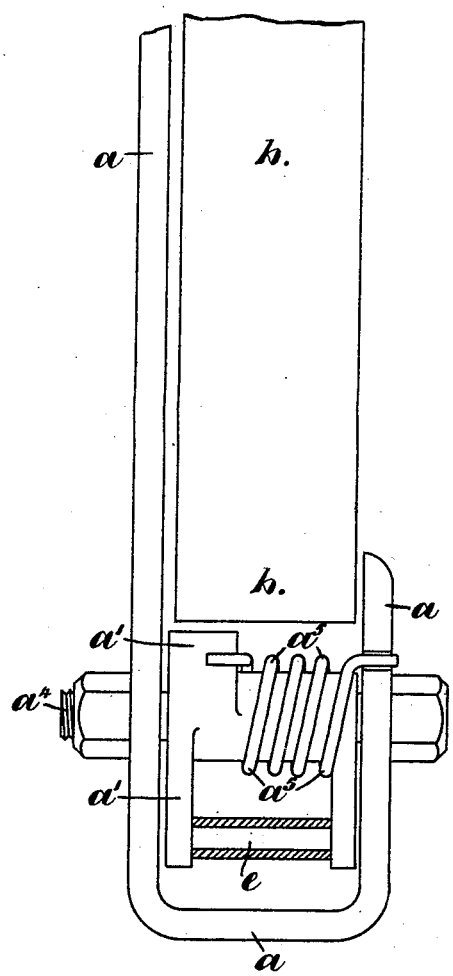
Figure 4:
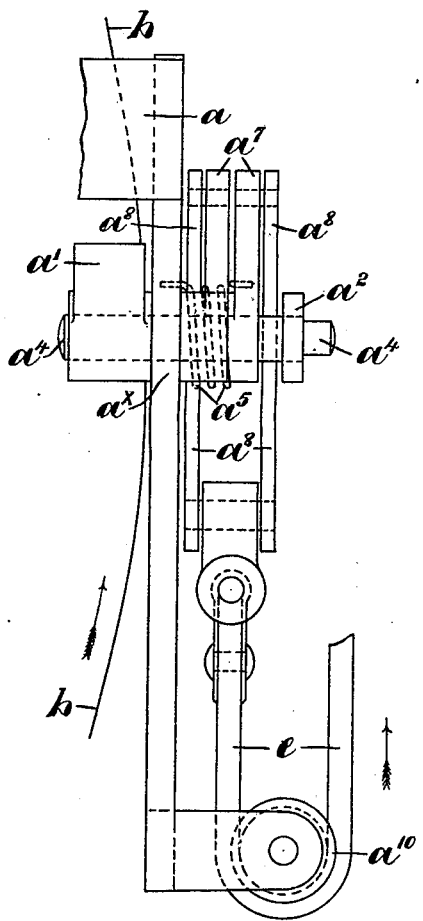
Figure 5:
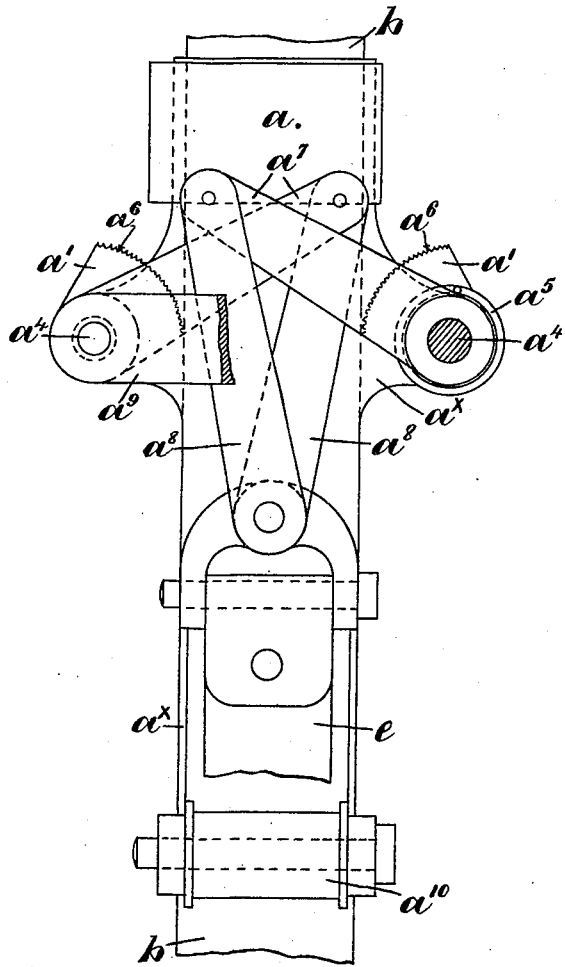
Figure 9:
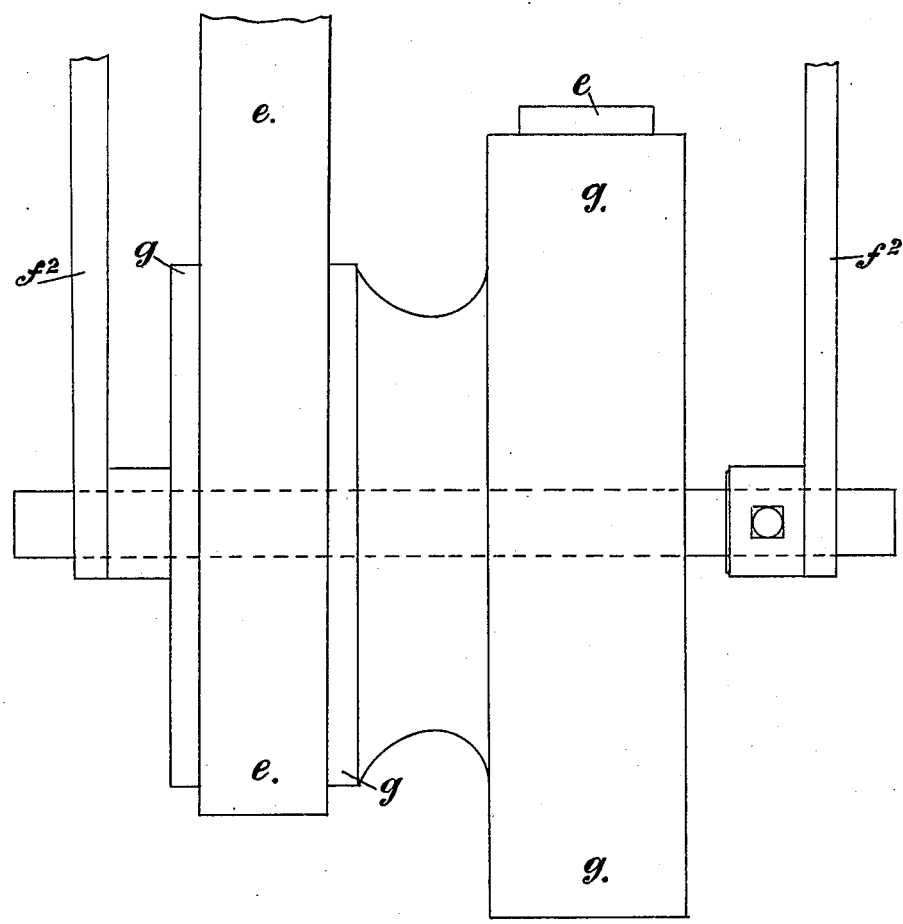

In the drawings illustrating the invention, Figure 1 is a general view of an autocarriage. Fig. 2 is a side elevation, and Fig. 3 a front elevation, showing the gripping mechanisms; and Figs. 4 and 5 are a side elevation and an end view showing a modification. Figs. 6, 6$^A$, and 6$^B$ are side elevations, and Fig. 7 is a plan, showing details for providing half-compression and variation of ignition mechanism. Fig. 8 is a side elevation, and Fig. 9 an end view, showing the hand-actuated mechanism; and Fig. 8$^A$ is a detail.

In the drawings, $a$ is a lever mounted loosely on the hub of the fly-wheel $b$, carrying a gripping device $a'$.

$a^2$ is a segment on the collar of $a$, to which the chain $a^3$ is connected, the other end of this chain being connected to a sleeve $c$, sliding on the rod $c'$ and normally pressed in one direction by the spring $c^2$. The rod $c$, which is supported by the car, has an adjustable sleeve $c^3$ to vary the tension of the spring. The pawl $a'$ is mounted on a pin $a^4$, and the coil-spring $a^5$ normally presses and holds the engaging edge $a^6$ of $a'$ off the wheel $b$. The strap $e$ is attached to the other end of the pawl and operates it when in action. This strap $e$ is actuated from the seat $d$—viz., just in front of it—where a direct pull-up handle $f$ is provided, and the strap passes through the guide-rollers $f'$ to a differential pulley-wheel $g$. The part of the strap $e$ to which the handle $f$ is connected wraps around and is attached to the smaller of these pulleys, while the part $e$, which is directly connected to the pawl-gripper $a'$, is directly connected to the larger of the pulleys. By this means the movement of the latter part and the lever $a$ is more rapid than that of the handle $f$.

The double pulleys $g$ are supported from the lower part of the frame proper, $x$, of the carriage by brackets $f^2$.

In action the driver grasps the handle $f$ and pulls it sharply upward and through the belt $e$ actuates the pawl $a'$, which grips on the fly-wheel $b$ and produces a rigid connection between the handle $f$ and the fly-wheel, whereupon the full stroke of the handle is made. By one or two of such actions the engine is easily started. The spring $c^2$ returns the lever $a$.

In the modified gripping device, Figs. 4 and 5, two grippers $a'$ are used, being mounted on the spindles $a^4$, carried by a plate $a^\times$, fixed to the hanger-lever $a$. The spindles $a^4$ are operated by levers $a^7$, which are connected through pulling-links $a^8$, to the end of which the strap $e$ is attached, this strap being passed over a roller $a^{10}$ on the end of the plate $a^\times$. A link $a^9$ connects the spindles $a^4$ together. When the links $a^8$ are pulled, they move the edges of the grippers $a'$ onto the edges of the wheel $b$, which grip it equally on either side and so move the wheel. When the strap $e$ is released, the parts return to their normal positions.

Referring now to the means for enabling the driver from his seat to work the engine with a half-compression of the combustible charge in the cylinder $k$ and at the same time as turning the fly-wheel $b$, a lever $h$ in front of the driver's feet is provided and is connected by a rod $i$ with the cam mechanism which operates the exhaust-valve.

$j$ is the exhaust-valve casing on the cylinder $k$, and $j'$ its spindle. This mechanism (seen in detail in Figs. 6, 6$^A$, 6$^B$, and 7) consists as follows: The valve-stem $j'$ is operated by the cam $m$ through a lever $n$, a rod $o$, a rocking lever $p$ on a spindle $p'$, and an arm $q$, resting on a flat ledge on the boss or lower end of the arm $p$, as shown, and the rod $i$ is connected with the lever $n$ by the link $r$ and a loose link connection $p^2$. The cam $m$ is driven at half-speed by tooth-gearing in the usual way from the main shaft $l$. $m'$ is the main-exhaust rise on $m$, and the rise for operating the exhaust for obtaining half-compression is designated $m^2$, and a roller-wheel $n'$ on the lever $n$, which acts in connection with these rises of the cam in the well-known manner, receives its lateral movement for effecting this object by the link $r$. As in the drawings, the roller $n'$ is operated only by the rise $m'$; but when $r$ is moved the inclined part $r^2$ moves the spindle $n^2$ of $n'$ and the roller laterally, so that the roller $n'$ will be operated by both the cam-pieces. When the link is withdrawn, the roller $n'$ moves back automatically. By pressing the lever $h$ forward by the foot it pushes through the rod $i$ the link $r$ over and actuates the spindle $n^2$, as just described, and so effects the half-compression, and then by drawing the lever $h$ back by the foot this device is thrown out of action and full compression takes place. When the half-compression mechanism is "off," the link $r$ and the end of the rod $i$ connected with it receive movement by the action of the cam $m'$ and lever $n$ each revolution, and so that this may take place without affecting the lever $h$ and mechanisms generally a free movement is provided by the blocks $p^3$ (at the point $s$ in the rod $i$) and the connecting-links $p^2$, these links $p^2$ being made of such a length that when vertical space between the two blocks exists. (See Fig. 6$^B$.) Hence no matter in what position the upper block $p^3$ may be the lower block may be moved longitudinally in relation to it; but at the same time by moving the rod $i$ one way or the other these blocks $p^3$ will be brought onto one another, and the device then becomes a solid connection capable of moving the arm $r$ in either direction. In conjunction with this operation and controlling the compression from the seat for starting purposes I also combine with this a mechanism for varying the point of the stroke at which the charge is ignited—namely, made later than when ordinarily working—and so as to avoid explosions before the commencement of the outstroke of the piston. This mechanism consists (see Fig. 6) of an arm $t$ on the shaft $z$, having a spring electric contact-arm $t'$, the end of which bears on a pulley $t^2$, of insulating material, fixed on the shaft $z$, but having a metallic piece $t^3$ in it. The arm $t$ of the contact $t'$ is worked from the rod $i$ by a rod $u$, a bell-crank $u'$, and connecting-rod $u^2$. When the rod $i$ is operated from the seat by the foot-lever $h$, it simultaneously moves the arm $r$ and the arm $t$ through the rod $u$, lever $u'$, and rod $u^2$, and so while putting the half-compression into action also moves the contact $t'$ a certain amount around the pulley $t^2$, and so the metal piece $t^3$ comes in contact with the contact-arm $t'$ later in the stroke. Consequently the current of electricity for effecting the ignition, which passes through this contact, will be made later in the stroke, and premature ignition is avoided.

The main characteristics and effect, therefore, of this invention are such that it provides by the hand-actuated part for turning the fly-wheel and by a device for controlling the compression and adjusting the time of ignition, all operated from the seat, a means by which such engines can be easily started by the passenger or driver and as required and so that the engine has not to keep running continuously while the vehicle is standing, as at present happens, which is a great defect.

What is claimed in respect of the herein-described invention is—

1. Means for starting the oil or like engines of autocars, comprising in combination a lever adjacent to the seat of the driver; a rod $i$ moved thereby; an arm $r$ having an incline $r'$ thereon, connected with the opposite end of $i$, and with the exhaust-valve-operating lever $n$; a roller $n'$ adapted to be operated laterally by the arm $r$, and a loose joint comprising the blocks $p^3$ and link $p^2$ on $i$; and cams $m'$ $m^2$ coöperating with said roller $n'$ substantially as and for the purposes set forth.

2. Means for starting the oil or like engines of autocars, comprising in combination a lever adjacent to the seat of the driver; a rod $i$ moved thereby; an arm $r$ having an incline $r'$ thereon, connected with the opposite end of $i$, and with the exhaust-valve-operating lever $n$; a roller $n'$ adapted to be operated laterally by the arm $r$, and a loose joint comprising the blocks $p^3$ and link $p^2$ on $i$; and an arm $t$ carrying the ignition commutator or contact $t'$ for varying the point of ignition, also connected with and operated by said rod $i$; and cams $m'$ $m^2$ coöperating with said roller $n'$ substantially as set forth.

In witness whereof we have hereunto set our hands in presence of two witnesses.

JOHN HOPE.
WILLIAM EDW. BUCKLEY.

Witnesses:
JNO. W. BROWN,
FRANK E. FLEETWOOD.